May 6, 1947. W. F. BARTLETT ET AL 2,420,220
SEAT BACK CONSTRUCTION
Filed July 13, 1944 3 Sheets-Sheet 1

Inventors:
Walter F. Bartlett and
Mitchell J. Grzenia,
By Dawson, Ooms and Booth,
Attorneys.

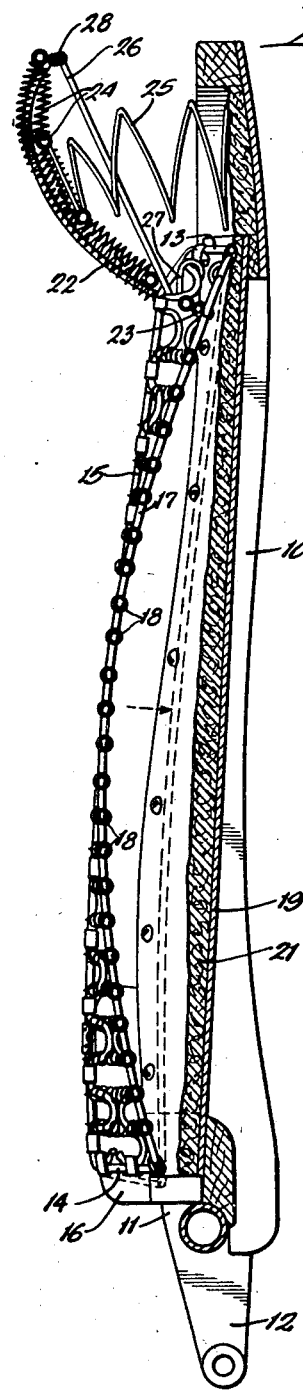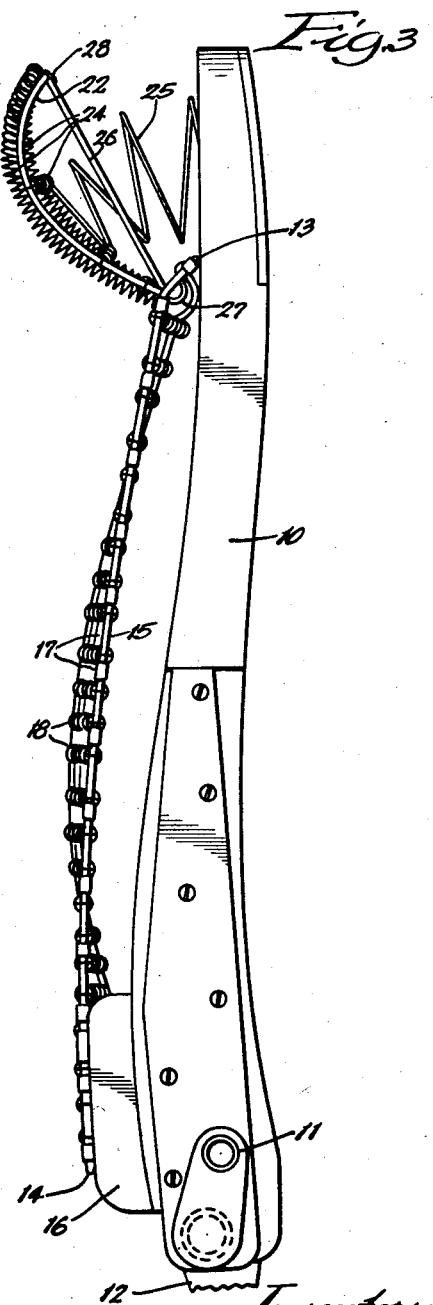

May 6, 1947.　　W. F. BARTLETT ET AL　　2,420,220
SEAT BACK CONSTRUCTION
Filed July 13, 1944　　3 Sheets-Sheet 3
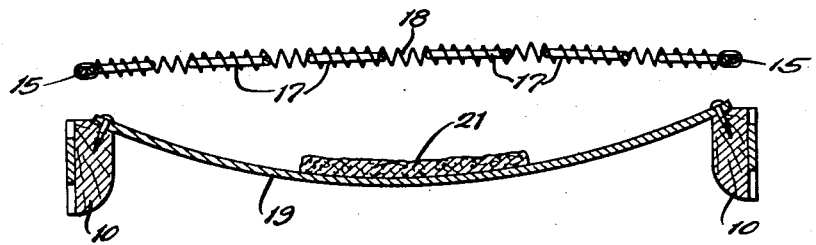
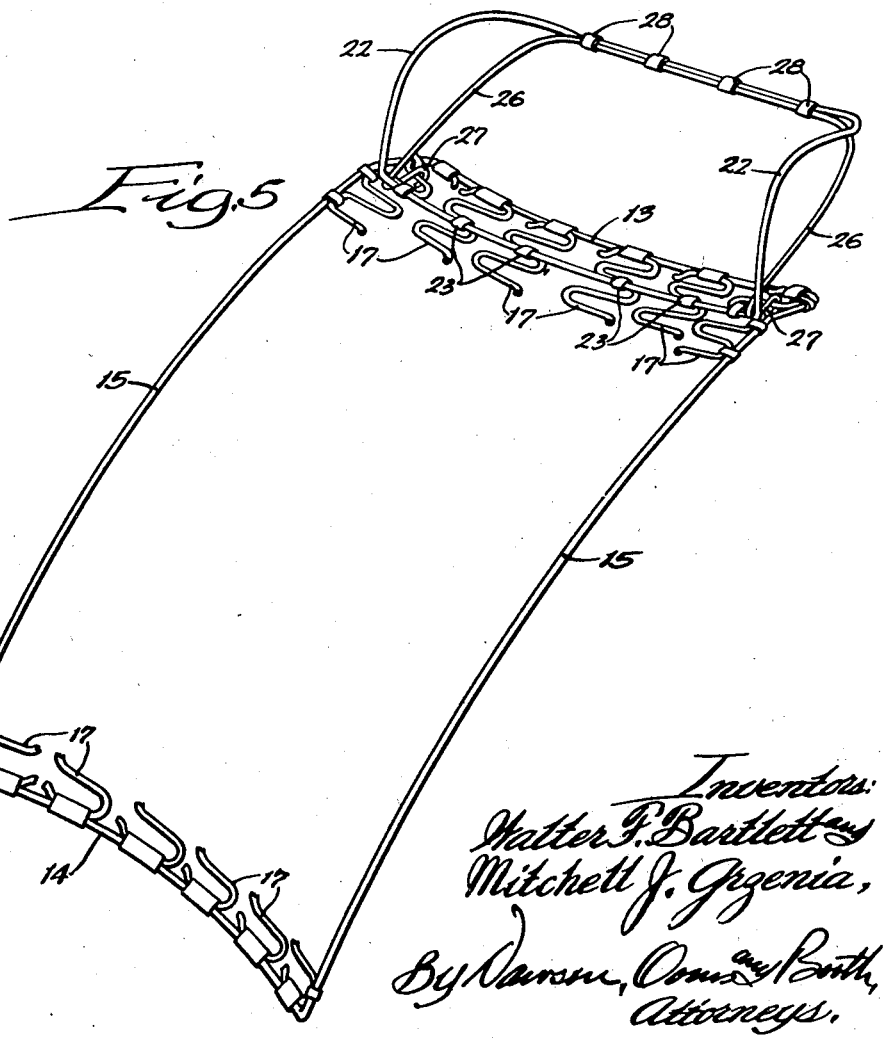

Patented May 6, 1947

2,420,220

UNITED STATES PATENT OFFICE 2,420,220

SEAT BACK CONSTRUCTION

Walter F. Bartlett, La Grange, and Mitchell J. Grzenia, Chicago, Ill., assignors to S. Karpen & Bros., Chicago, Ill., a corporation of Illinois Application July 13, 1944, Serial No. 544,654

4 Claims. (Cl. 155—179)

This invention relates to a seat back construction for use with a seat of the type used on railroad cars, buses, aircraft and the like.

One of the objects of the invention is to provide a seat back construction in which resiliency is provided by a plurality of sinuous springs tied together by transversely extending coil springs. Preferably, the coil springs are coiled around laterally projecting looped portions of the sinuous springs to connect them.

Another object is to provide a seat back construction which is shaped for maximum comfort. According to one desired feature the back is bowed inwardly in horizontal planes adjacent the top and bottom and is yielding throughout its width in its central portion so that it will follow the configuration of an occupant without producing hard spots.

Still another object is to provide a seat back construction in which a yieldingly pivoted headrest is provided which is supported by cantilever springs.

Still further object of the invention is to provide a seat back construction producing maximum leg room between adjacent seats without permitting the leg or knee position of one occupant to interfere with the comfort of the occupant of another seat.

The above and other objects and advantages of the invention will be more readily apparent from the following description when read in connection with the accompanying drawings, in which Figure 1 is a front elevation of a seat back construction embodying the invention with the upholstering and padding removed;

Figure 2 is a section on the line 2—2 of Figure 1;

Figure 3 is a side elevation of the construction of Figure 1;

Figure 4 is a transverse section on the line 4—4 of Figure 1; and

Figure 5 is a perspective view of the back frame work with parts removed.

Figure 1:
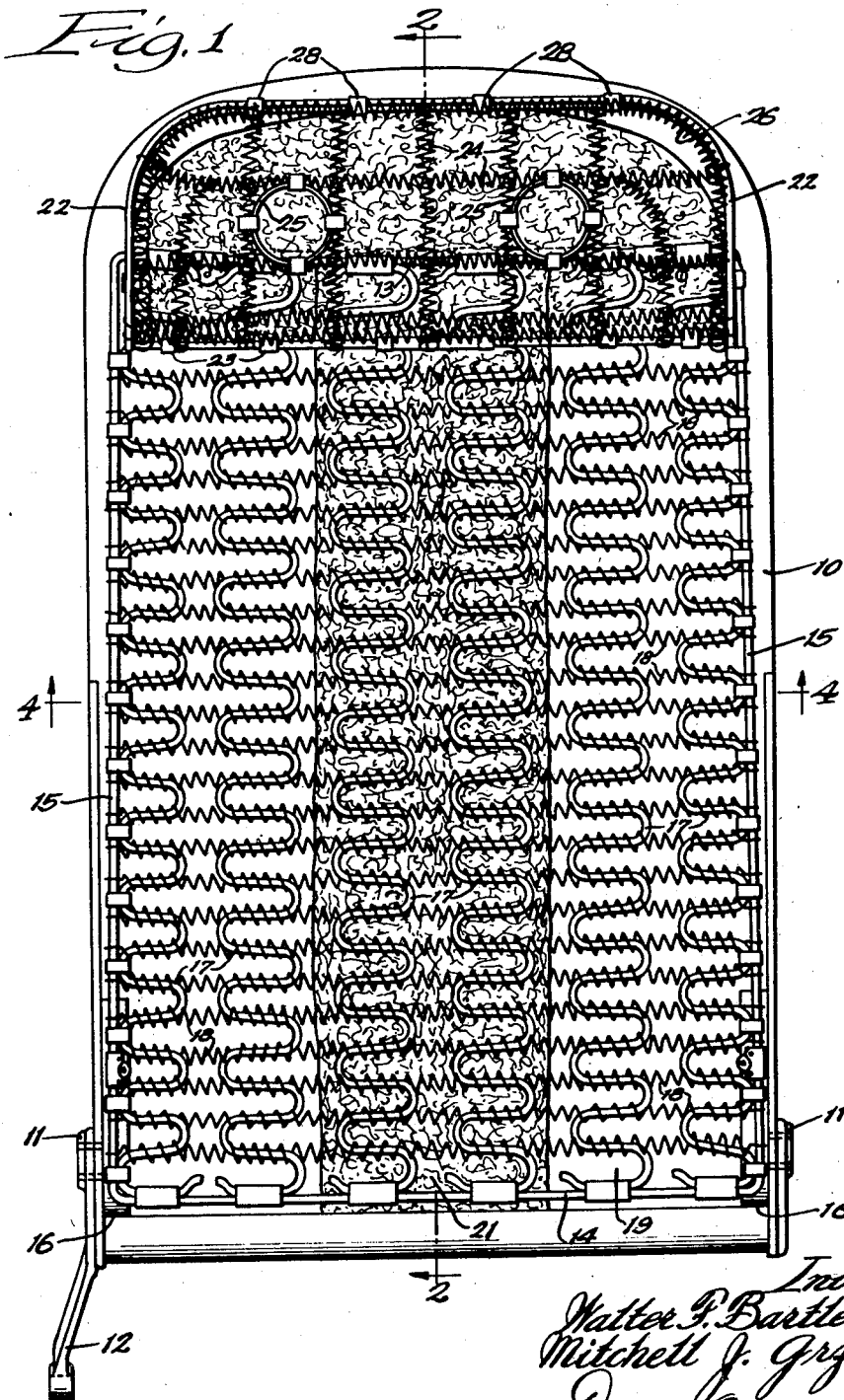

The seat back construction as shown, comprises a generally rectangular frame 10 which may be made of wood or like material which is rigid throughout. As illustrated, the seat back is adapted to be pivoted for tilting more or less toward a vertical position about pivoting brackets 11 under the control of a lever 12 which may be connected to any desired type of back control mechanism. The frame 10 is cut out in its central portion to provide an opening therethrough to lighten the structure and to decrease the amount of space required therefor.

In front of the frame 10 a back frame work is connected comprising an upper cross member 13 and a lower cross member 14 connected by resilient side members 15. The upper cross member 13 is connected to the upper part of the frame and the cross member and frame are bowed inwardly at the central portion. The lower cross member 14 is similarly connected to the lower portion of the frame. Side blocks 16 connected to the frame support the ends of the cross member 14 so that it is bowed inwardly in its central portion.

The cross members 13 and 14 are connected by a series of sinuous springs 17 extending generally parallel between the cross members. Each of the springs 17 is formed with a series of laterally extending loop portions having parallel sides so that they form flat spring members lying generally in the same plane to provide a substantially continuous smooth surface. The springs 17 are interconnected by a series of coil springs 18 extending between the side members 15. The coil springs 18 are connected to the sinuous springs 17 by being coiled around the parallel side portions of the loops on the sinuous springs. In this way, a substantially uniform continuous flexible back is provided.

The side ones of the springs 17 are substantially straight following the side members 15 of the frame work while the intermediate springs 17 are bowed outwardly so that their central portions lie in substantially the same plane as the side members 15 as shown in Figures 2 and 3. Preferably the side members 15 of the frame work are not straight but are bowed out slightly. With this construction, the intermediate part of the back is substantially straight transversely while the upper and lower parts of the back bow inwardly at the center. Since the side members 15 are resilient and are spaced from the rigid frame work 10, the seat back is yielding throughout its full width. It can, therefore, follow the contour of an occupant without creating hard spots. The bowing inward of the back at its upper and lower extremities prevents undue pressure at the base of the spine and the back of the neck so that an occupant will be supported in comfort.

The opening in the frame 10 is adapted to be closed to prevent the knees or legs of a person behind the seat, from pressing into the back of the seat occupant. For this purpose a thin substantially rigid sheet 19 is connected to the forward side of the frame 10 spanning the opening in the frame. Preferably the sheet 19 is bowed outwardly as shown in Figure 4 to provide greater clearance and may be covered with a pad 21 to cushion the seat back in the event it is forced against the sheet 19. When the seat is covered with upholstery or the like, the cover may follow the contour of the frame 10 and sheet 19 at the back of the seat providing maximum knee room for the occupant of a seat behind.

At the upper part of the seat back a head rest is provided formed by a wire frame work 22 generally rectangular in front outline with its sides bowed outwardly. The frame work 22 is hinged to the back by clips 23 connecting the lower cross member of the frame work 22 to transversely extending portions of the loops in the sinuous springs 17. The frame work supports a series of crossed coil springs 24 which follow in general the outline of the frame work and the intermediate portions of which may be further supported by coil springs 25 engaging the frame 10. The frame work is urged forwardly away from the back by cantilever spring members 26. As shown, a single U-shaped spring member is employed hooked over looped portions of the sinuous springs 17 at its ends as indicated at 27 with its intermediate portion secured to the upper cross member of the headrest frame 22 by clips 28. The spring member 26 provides the principal supporting force for the headrest, the springs 25 being provided principally to prevent undue sagging of the springs 24 in the central portion of the frame. When the seat is covered the headrest is pulled partially back toward the frame 10 from the position shown in Figures 2 and 3 by the covering. When an occupant's head engages the headrest, it may yield in the central portion due to the resiliency in the springs 24 and 25 and the entire headrest may pivot about the clips 23 against the spring member 26.

While one embodiment of the invention has been shown and described in detail herein, it will be understood that this is illustrative only and is not intended as a definition of the scope of the invention, reference being had for this purpose to the appended claims.

What is claimed is:

1. A seat back construction comprising a frame having top and bottom cross members bowed inwardly between their ends and flexible side members connecting the top and bottom members, a series of sinuous springs extending between the top and bottom cross members and formed with laterally extending loop portions, the intermediate springs being bowed outwardly between their ends substantially into alignment with the side members, transverse coil springs extending between the side members and coiled around the loop portions of the sinuous springs, a headrest hinged to loop portions of the sinuous springs adjacent the top of the back, and cantilever springs hooked over loop portions of the sinuous springs adjacent the headrest hinge and engaging the headrest to urge it away from the back.

2. A seat comprising a generally rectangular rigid frame open in its central portion, a flexible back secured to and spaced from one side of the frame to move toward the frame in response to pressure thereon, the back including top and bottom cross members bowed inwardly between their ends and a series of flat spring members connecting the cross members, the intermediate spring members being bowed outwardly between their ends substantially into alignment with the side spring members, and a thin substantially rigid cover sheet secured to said one side of the frame to close the opening and being spaced from the back.

3. The construction defined in claim 2 in which the cover sheet is bowed toward the other side of the frame intermediate its edges.

4. A seat construction comprising a spring frame having top and bottom cross members and flexible side members connecting the top and bottom members, a series of sinuous springs extending between the top and bottom cross members and formed with laterally-extending loop portions, transverse coil springs extending between the side members and coiled around the loop portions of the sinuous springs, a headrest hinged to loop portions of the sinuous springs adjacent the top of the back, and cantilever springs hooked over the loop portions of the sinuous springs adjacent the headrest hinge and engaging the headrest hinge to urge it away from the back.

WALTER F. BARTLETT.
MITCHELL J. GRZENIA,

REFERENCES CITED

The following references are of record in the file of this patent:

UNITED STATES PATENTS

| Number | Name | Date |
| --- | --- | --- |
| 2,292,597 | Bartlett et al. | Aug. 11, 1942 |
| 1,301,778 | Young | Apr. 22, 1919 |
| 971,428 | Bowman | Sept. 27, 1910 |
| 1,155,223 | Douglass | Sept. 28, 1915 |
| 2,234,253 | Hopkes | Mar. 11, 1941 |
| 2,122,979 | Gleason | July 5, 1938 |
| 2,102,351 | Beck | Dec. 14, 1937 |
| 1,155,391 | Young | Oct. 5, 1915 |
| 782,823 | Budd | Feb. 21, 1905 |
| 1,394,005 | Graff et al. | Oct. 18, 1921 |
| 2,356,417 | Mayer | Aug. 22, 1944 |
| 2,293,566 | Shonahan | Aug. 18, 1942 |
| 2,274,176 | Widman | Feb. 24, 1942 |
| 2,261,996 | Haberstump | Nov. 11, 1941 |